(12) United States Patent
Unno et al.

(10) Patent No.: US 8,127,609 B2
(45) Date of Patent: Mar. 6, 2012

(54) ANGULAR VELOCITY SENSING ELEMENT

(75) Inventors: Ken Unno, Tokyo (JP); Takao Noguchi, Tokyo (JP); Kenichi Tochi, Tokyo (JP); Kazuya Maekawa, Tokyo (JP)

(73) Assignee: TDK Corporation, Tokyo (JP)

( * ) Notice: Subject to any disclaimer, the term of this patent is extended or adjusted under 35 U.S.C. 154(b) by 603 days.

(21) Appl. No.: 12/318,329

(22) Filed: Dec. 24, 2008

(65) Prior Publication Data
US 2009/0165556 A1 Jul. 2, 2009

(30) Foreign Application Priority Data
Dec. 28, 2007 (JP) ................................. 2007-338572

(51) Int. Cl.
*G01C 19/56* (2012.01)
(52) U.S. Cl. .................... 73/504.16; 73/504.15
(58) Field of Classification Search ............... 73/504.12, 73/504.14, 504.15, 504.16; 310/329
See application file for complete search history.

(56) References Cited

U.S. PATENT DOCUMENTS

| | | | | |
|---|---|---|---|---|
| 5,721,377 | A | * | 2/1998 | Kurle et al. ................. 73/504.12 |
| 6,018,997 | A | * | 2/2000 | Kumada et al. ............ 73/504.16 |
| 2002/0112538 | A1 | * | 8/2002 | Pinter et al. ................. 73/514.32 |
| 2004/0095046 | A1 | | 5/2004 | Ouchi et al. |

FOREIGN PATENT DOCUMENTS
JP   A-2003-227719   8/2003
* cited by examiner

*Primary Examiner* — John Chapman, Jr.
(74) *Attorney, Agent, or Firm* — Oliff & Berridge, PLC (57) ABSTRACT

An angular velocity sensing element is provided, which is able to prevent breakage of an oscillation arm even when an excessively large shock is given. An angular velocity sensing element 2 according to the present embodiment includes oscillation arms 22, 23 and 24 formed of a semiconductor material, and a stopper member provided to limit the oscillation range of the oscillation arms. As such a stopper member, a first stopper member 25 is provided, for example, which limits the oscillation range of the oscillation arms at least within a single plane of the arms. Fixing portions 21, the oscillation arms 22, 23 and 24 and the first stopper member 25 are integrally formed by processing a semiconductor material, such as silicon.

4 Claims, 13 Drawing Sheets

ANGULAR VELOCITY SENSING ELEMENT

BACKGROUND OF THE INVENTION

1. Field of the Invention

The present invention relates to an angular velocity sensing element which detects angular velocity of an object.

2. Description of the Related Art

Angular velocity sensing elements have been utilized in the technology of autonomously controlling attitude such as of boats, airplanes and rockets. Recently, use of such angular velocity sensing elements has been extended to small electronic devices, such as car navigation systems, digital cameras, video cameras and cellular phones. With this trend, there has been a need for the angular velocity sensing elements to have smaller size and lower height (reduced thickness).

Oscillation arms of oscillation type angular velocity sensors have prevalently been fabricated by machining and molding piezoelectric materials. However, since the accuracy of machining naturally has a limitation, it has been difficult to meet the need of the smaller size and lower height in the sensors.

To realize angular velocity sensors of smaller size and lower height, Japanese Patent Laid-Open Publication No. 2003-227719, for example, suggests a technique for finely processing a semiconductor substrate made such as of single crystal silicon to form oscillation arms.

Angular velocity sensors in general have a space around oscillation arms (drive arms and sensor arms) to ensure the oscillation range thereof. However, being applied with an unexpectedly violent shock, an angular velocity sensing element having such very small oscillation arms formed of a semiconductor material, may be applied with a stress exceeding the breaking stress of each of the oscillation arms, being induced by the excessively large oscillation of the oscillation arms. In particular, the stress may impart an unexpected impulsive force to each oscillation arm. In this case, the stress, which is quite difficult to be mitigated in a short time, may partly break or may sometimes rupture (snap off) the oscillation arms. Under such circumstances, what is concerned is that the intrinsic function or performance as an angular velocity sensor may be lost.

The present invention has been made in light of the circumstances described above, and has as its object to provide an angular velocity sensing element which is able to effectively prevent damage and breakage that will be caused on the oscillation arms, being induced by an excessively large shock applied to the oscillation arms.

SUMMARY OF THE INVENTION

In order to achieve the object provided above, an angular velocity sensing element of the present invention includes: an oscillation arm formed of a semiconductor material, a piezoelectric element formed on the oscillation arm, and a stopper member provided to limit an oscillation range of the oscillation arm.

When an excessively large shock is applied to the angular velocity sensing element, the oscillation arm may be oscillated on a grand scale. For example, a free end side (open end side) of the oscillation arm may be oscillated at excessively large amplitude with respect to a fixing end, or portions between a plurality of fixing ends of the oscillation arm may be oscillated at excessively large amplitude with respect to the fixing ends. In such a case, oscillating portions of the oscillation arm come in touch, for example, with the stopper member, so that the oscillation is limited within a space defined by the stopper member. Thus, with the configuration mentioned above, even when an excessively large shock is applied to the element, the oscillation of the oscillation arm is settled in an allowable range to prevent the possible damage and breakage.

Preferably, the stopper member is arranged along a plane where the oscillation arm is formed, and has a first stopper member that limits the oscillation range of the oscillation arm within the plane. When a semiconductor material is used to form the oscillation arm, the oscillation arm extending along the plane can be easily formed by performing physical or chemical etching, for example, to remove portions of the semiconductor material other than the portion corresponding to the oscillation arm. In such a structure, the oscillation arm is estimated to cause in-plane oscillation (the oscillation along the plane). In this case, arrangement of the first stopper member along the plane where the oscillation arm is formed, will effectively limit the in-plane oscillation of the oscillation arm. In addition, the first stopper member arranged along the plane where the oscillation arm is formed can be fabricated concurrently with the formation of the oscillation arm, by processing the semiconductor material. Therefore, fabrication processes of the angular velocity sensing element can be simplified for the enhancement of the productivity. Also, arrangement of the oscillation arm and the first stopper member in the same plane can contribute to reducing the height of the angular velocity sensing element.

Alternatively, the stopper member is preferably arranged along a plane which is different from the plane where the oscillation arm is formed, and has a second stopper member that limits the oscillation range of the oscillation arm, the range being in a direction intersecting the plane where the oscillation arm is formed. As described above, depending on the forms of an oscillation arm, the in-plane oscillation is chiefly produced in the plane extended from the arm. However, depending on the directions of an external shock, it is well estimated that oscillation in a direction different from the direction along the plane, that is, oscillation outside the plane (out-of-plane oscillation), may be induced. For example, if the oscillation arm has a plate-like shape with a certain width, possible oscillations that may be expected in terms of the geometrical structure include oscillation perpendicular to the plane extended from the arm, twisted oscillation, and oscillation in the unobstructed direction, depending on the shapes of the oscillation arm. In this case, if the second stopper member is arranged along the direction intersecting the plane extended from the oscillation arm, the out-of-plane oscillation of the oscillation arm can be effectively limited by the second stopper member.

Preferably, the stopper member has a part with which at least a portion of the oscillation arm comes in touch, the part having a shape that goes along a form of the oscillation arm when the part comes in touch with the oscillation arm. Thus, the portion of the oscillation arm in touch with the stopper member can be supported by the face of the stopper member. Thus, the impulsive force at the time when the oscillation arm collides against the first stopper member will not be locally focused (e.g., on a point) but the impulsive force will be dispersed in the touch surface between the stopper member and the oscillation arm.

Preferably, the stopper member is arranged with a given space provided between itself and the oscillation arm to enclose the oscillation arm throughout a perimeter thereof (or all portions thereof). The space between the stopper member and the oscillation arm may be uniform throughout the perimeter of the oscillation arm, or may be appropriately varied so as to be different depending on portions. In this way, when the oscillation arm is excessively oscillated in every direction, all portions of the oscillation arm can be protected from the excessive oscillation.

According to the present invention, the stopper member for limiting the oscillation range of the oscillation arm is provided. Thus, even when an excessively large shock is applied to the angular velocity sensing element, the stopper member can suppress the excessive oscillation of the oscillation arm caused by the shock so as to fall within a predetermined range. Thus, the stress applied to the oscillation arm can be suppressed to prevent the oscillation arm from being damaged or broken.

DETAILED DESCRIPTION OF THE PREFERRED EMBODIMENTS

With reference to the drawings, hereinafter will be described some embodiments of the present invention. It should be appreciated that in the drawings, identical components are designated with identical reference symbols to omit repeated explanation. Also, the positional relationship, such as top and bottom or right and left, is based on the positional relationship shown in the drawings unless particularly mentioned otherwise. Further, the dimensional ratios are not limited to the ones shown in the drawings. Furthermore, the embodiments provided below are exemplifications for explaining the present invention, and thus the present invention should not intended to be limited only to these embodiments. Additionally, the present invention may be modified in various manners without departing from the spirit of the present invention.

First Embodiment

Figure 1:
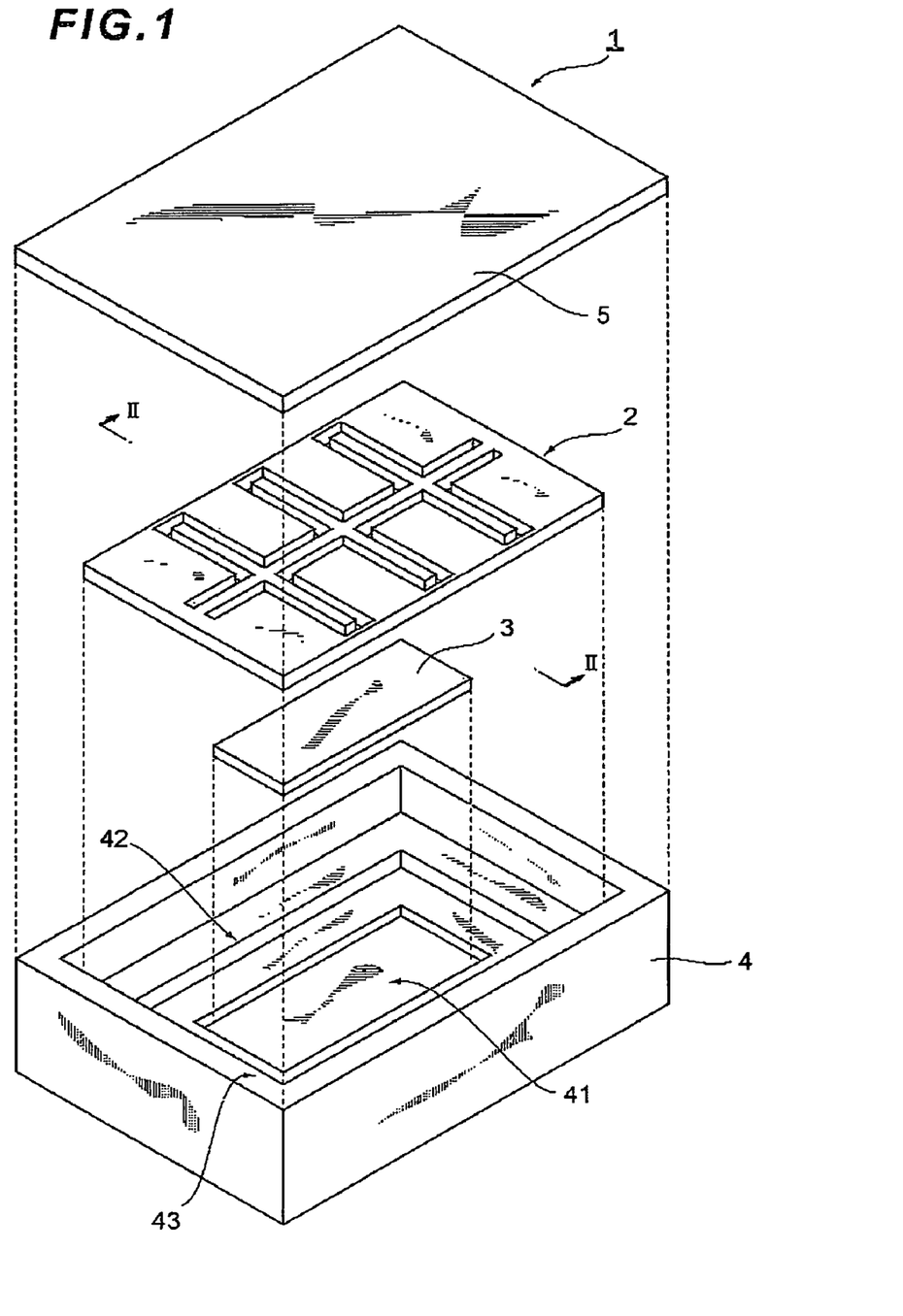
FIG. 1 is an exploded perspective view illustrating an angular velocity sensor device according to a first embodiment of the present invention.
Figure 2:
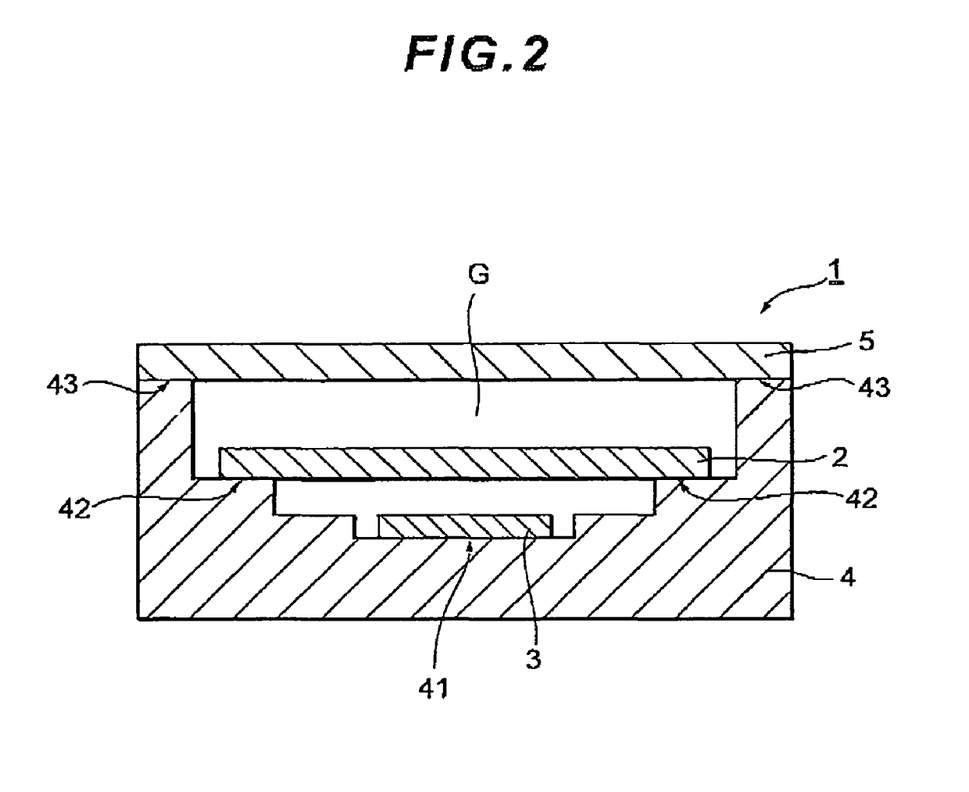
FIG. 2 is a cross-sectional view taken along II-II line of FIG. 1.

FIG. 1 is an exploded perspective view of an inner configuration of an angular velocity sensor device 1 according to a first embodiment. FIG. 2 is a cross-sectional view taken along II-II line in the angular velocity sensor device 1.

In the angular velocity sensor device 1, an upper cover member 5 is disposed on top of a case 4 to form an inner space G (see FIG. 2) in which an angular velocity sensing element 2 and an integrated circuit element 3 are arranged.

As will be described later, the angular velocity sensing element 2 is configured to transmit drive signals to piezoelectric elements provided at drive arms of the angular velocity sensing element 2, and to receive detection signals outputted from piezoelectric elements provided at sensor arms of the angular velocity sensing element 2. The case 4 is formed by stacking a plurality of thin ceramic plates, for example, and has a stepped recess that can accommodate the angular velocity sensing element 2 and the integrated circuit element 3. The upper cover member 5 is formed, for example, of a ceramic material which is the same as the one used for the case 4.

As shown in FIG. 1, an integrated circuit support portion 41 having an annular shape is formed at the deepest part of the recess of the case 4. The integrated circuit element 3 is disposed on the integrated circuit support portion 41. Also, a sensing element support portion 42 having an annular shape is formed around the integrated circuit support portion 41 but being positioned at a level shallower than the integrated circuit support portion 41. The angular velocity sensing element 2 is disposed on the sensing element support portion 42. Further, an upper cover support portion 43 having an annular shape is formed around the sensing element support portion 42 to provide an outer edge of the recess. The upper cover member 5 is disposed over the support portion 43 so as to seal the recess of the case 4 from outside and form the inner space G (see FIG. 2).

As shown in FIGS. 1 and 2, the angular velocity sensing element 2 is formed within and along a plane parallel to a plane that includes the sensor element support portion 42 of the case 4. In other words, the angular velocity sensing element 2 is a so-called transversal-type element.

Figure 3:
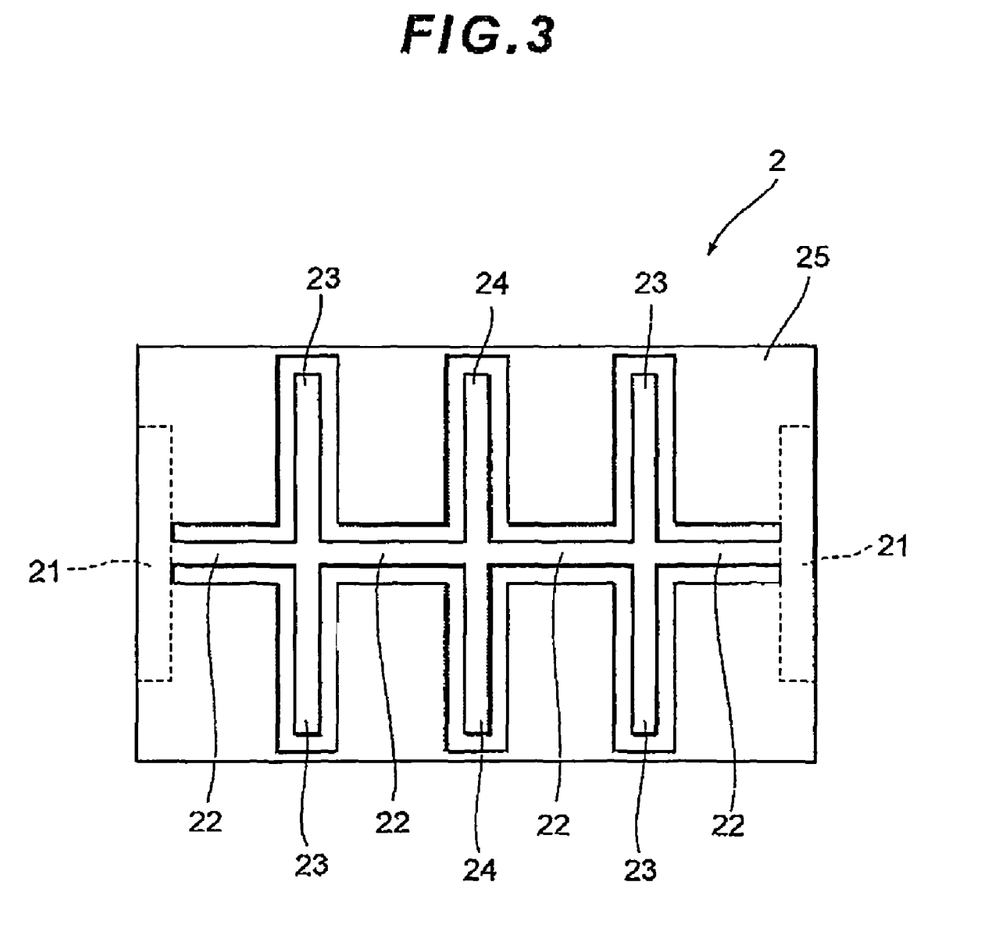
FIG. 3 is a top view illustrating the configuration of an angular velocity sensing element illustrated in FIG. 1.

FIG. 3 is a plan view illustrating an example of an upper surface configuration of the angular velocity sensing element 2.

The angular velocity sensing element 2 is provided with two fixing portions 21, a transmission arm 22 disposed between the two fixing portions 21, oscillation arms consisting of drive arms 23 and sensor arms 24, and a first stopper member 25 integrally formed with the fixing portions 21 to enclose the oscillation arms throughout the perimeter thereof.

A bottom portion of each fixing portion 21 is in contact with an upper surface of the sensing element support portion 42 of the case 4. Preferably, the bottom portion of each fixing portion 21 may be fixed to the sensing element support portion 42 using an adhesive or the like. Fixation of the fixing portions 21 to the sensing element support portion 42 can permit the end portions of the transmission arm 22 to serve as fixing ends.

The transmission arm 22 has ends which are coupled to the two fixing portions 21. Thus, the transmission arm 22 can be oscillated in a vertical direction (a direction perpendicular to the direction to which the transmission arm 22 is extended), with the ends thereof serving as the fixing ends.

Each drive arm 23 has an end which is coupled to the transmission arm 22. In the present embodiment, a total of four drive arms 23 are coupled to the transmission arm 22. Two drive arms 23 are coupled to one point of the transmission arm 22 and the remaining two drive arms 23 are coupled to another point of the transmission arm 22. When the transmission arm 22 is equally divided into four, the two points of the transmission arm 22, to which the drive arms 23 are coupled, correspond to the two adjacent points sandwiching the center point. The two drive arms 23 which extend from one point or another point of the transmission arm 22 are adapted to be line symmetrical, with the transmission arm 22 as being the reference line. In this way, each drive arm 23 is coupled, only at one end thereof, to the transmission arm 22, with the other end remaining free. The end of each drive arm 23, which remains free, is allowed to oscillate in the horizontal direction (the direction parallel to the direction to which the transmission arm 22 is extended).

The sensor arms 24 has one end which is coupled to the transmission arm 22. In the present embodiment, a total of two sensor arms 24 are coupled to the transmission arm 22. In the present embodiment, when the transmission arm 22 is equally divided into two, the two sensor arms 24 are coupled to the center point. The two sensor arms 24 are adapted to be line symmetrical, with the transmission arm 22 as being the reference line. The other end of each sensor arm 24, which remains free, is allowed to oscillate in the horizontal direction.

The first stopper member 25 is arranged with a given clearance (space) provided between itself and each of the oscillation arms consisting of the transmission arm 22, the drive arms 23 and the sensor arms 24. Similar to the fixing portions 21, a bottom portion of the first stopper member 25 is in contact with the upper surface of the sensing element support portion 42 of the case 4. The bottom portion of the first stopper member 25 may be fixed to the sensing element support portion 42 using an adhesive or the like.

The first stopper member 25 is purposed to limit the oscillation range of the transmission arm 22, the drive arms 23 and the sensor arms 24 within a plane where the oscillation arms are extended. To this end, the first stopper member 25 may preferably be arranged with an even space between itself and each of the transmission arm 22, the drive arms 23 and the sensor arms 24. For example, it is preferred that a stopper member having an opening portion with a figure similar to the drive arms in a rest state, for example, is provided along the perimeters of the drive arms. Alternatively, it is preferred that a stopper member having an opening portion with a figure similar to the oscillation range of the oscillation arms in an oscillated state is provided along the perimeters of the oscillation arms.

In either of the cases, the stopper member is provided outside the oscillation range of the oscillation arms. Thus, the amplitude needed for the oscillation arms (e.g., drive arms and sensor arms) can be maintained, while at the same time, such oscillation that would exceed the amplitude required for the operation of the velocity sensing element can be reliably suppressed.

It should be appreciated that the fixing portions 21, the transmission arm 22, the drive arms 23, the sensor arms 24 and the first stopper member 25 are made of the same semiconductor material, such as silicon. These components can be formed at a time by patterning wafer.

Figure 4:
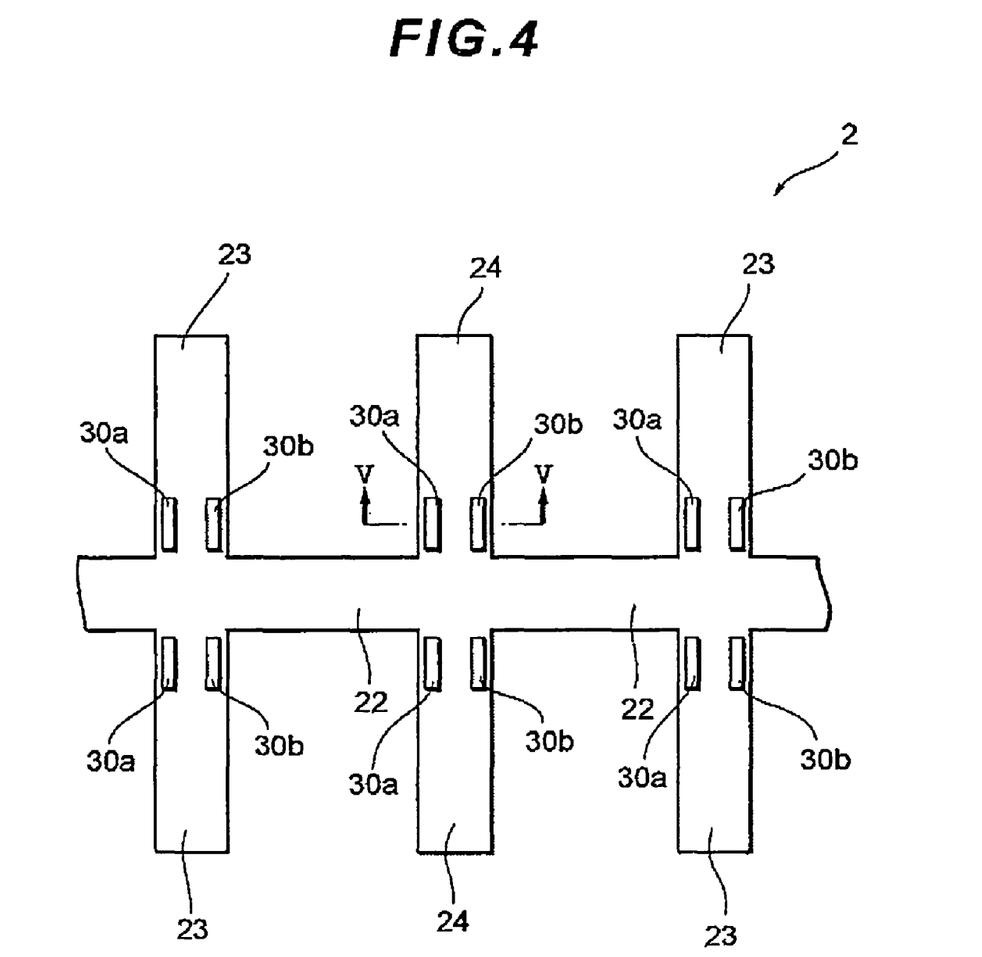
FIG. 4 is an enlarged view illustrating the angular velocity sensing element to indicate the arrangement of piezoelectric elements.

A pair of piezoelectric elements are arranged on the surface of each of the drive arms 23 and the sensor arms 24. FIG. 4 illustrates a principal part of the velocity sensing element 2 to explain the location of the piezoelectric elements. In FIG. 4, the first stopper member 25 is omitted.

As shown in FIG. 4, a pair of piezoelectric elements 30a and 30b are formed on the surface of each drive arm 23. The longitudinal direction of the pair of piezoelectric elements 30a and 30b is made parallel to the direction to which the drive arm 23 is extended. The pair of piezoelectric elements 30a and 30b are provided for the purpose of permitting each drive arm 23 to oscillate along the plane which is parallel to the plane containing the angular velocity sensing element 2. Preferably, the pair of piezoelectric elements 30a and 30b are arranged in the direction intersecting the direction to which each drive arm 23 is extended. Also, the pair of piezoelectric elements 30a and 30b are preferably located at the positions where each drive arm 23 is distorted the most. For example, as shown in FIG. 4, each pair of piezoelectric elements 30a and 30b may preferably be formed at the drive arm 23 so as to locate in the vicinity of the coupling portion between the drive arm 23 and the transmission arm 22.

Similarly, a pair of piezoelectric elements 30a and 30b are formed on the surface of each sensor arm 24. The longitudinal direction of the pair of piezoelectric elements 30a and 30b is made parallel to the direction to which the sensor arm 24 is extended. The pair of piezoelectric elements 30a and 30b are provided for the purpose of permitting each sensor arm 24 to oscillate along the plane which is parallel to the plane containing the angular velocity sensing element 2. Preferably, the pair of piezoelectric elements 30a and 30b are arranged in the direction intersecting the direction to which each sensor arm 24 is extended. Also, the pair of piezoelectric elements 30a and 30b are preferably located at the positions where each sensor arm 24 is distorted the most. For example, as shown in FIG. 4, each pair of piezoelectric elements 30a and 30b may preferably be formed at the sensor arm 24 so as to locate in the vicinity of the coupling portion between the sensor arm 24 and the transmission arm 22.

Figure 5:
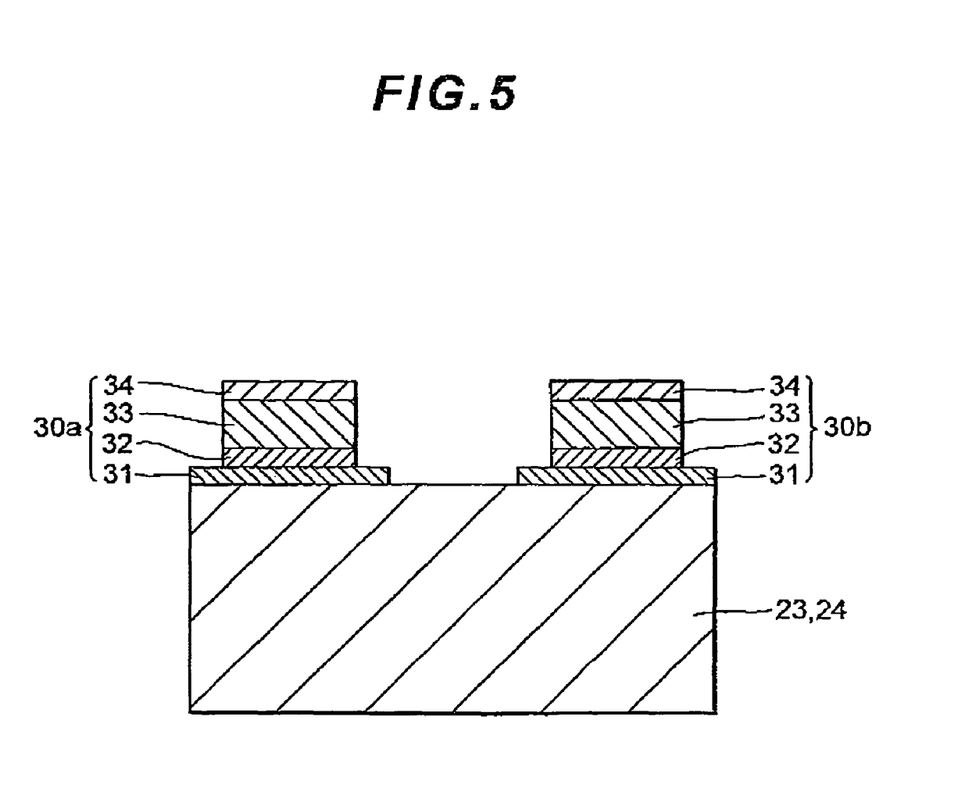
FIG. 5 is a cross-sectional view taken along V-V line of FIG. 4.

FIG. 5 is a cross-sectional view taken along V-V line of FIG. 4.

As shown in FIG. 5, the piezoelectric elements 30a and 30b are each formed by stacking an insulation layer 31, a lower electrode 32, a piezoelectric body 33 and an upper electrode 34, in this order, on each of the drive and sensor arms 23 and 24. As shown in FIG. 4, each piezoelectric element 30a is formed separately from each piezoelectric element 30b.

The insulation layer 31 is formed, for example, by stacking a $ZrO_2$ film and a $Y_2O_3$ film in this order. The lower electrode 32 is formed, for example, of a Pt(100)-oriented film. The piezoelectric body 33 is formed containing, for example, lead zirconate titanate (PZT). The upper electrode 34 is formed, for example, of a Pt(100)-oriented film.

Figure 6:
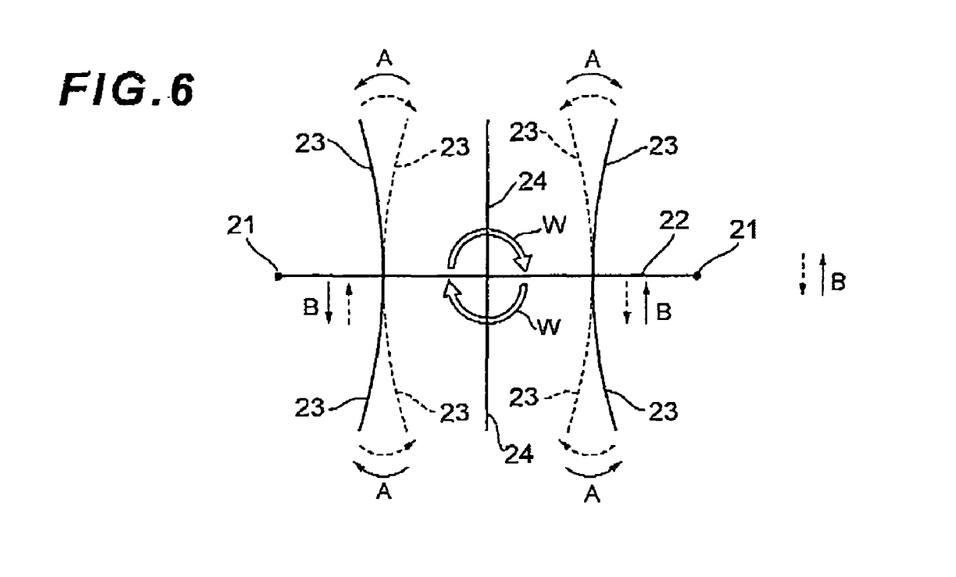
FIG. 6 illustrates driving oscillation of drive arms 23.
Figure 7:
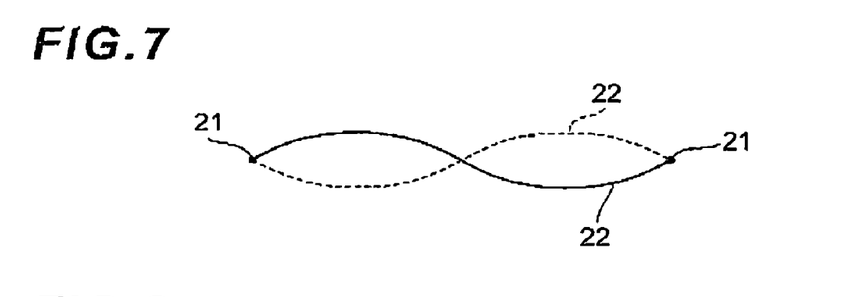
FIG. 7 illustrates bending oscillation of a transmission arm 22.
Figure 8:
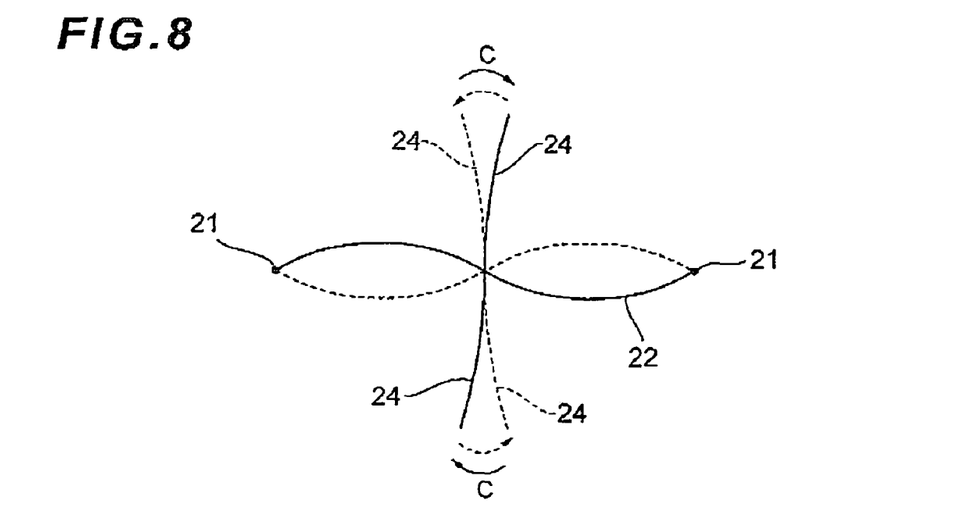
FIG. 8 illustrates sensing oscillation of sensor arms 24.

Hereinafter is described the operation of the angular velocity sensing element 2. FIGS. 6 to 8 are plan views schematically illustrating the operations of the transmission arm 22, the drive arms 23 and the sensor arms 24. In FIGS. 6 to 8, each of the oscillation arms is simply indicated by a line for the sake of clarifying the manner of oscillation. Also, those arms which are unnecessary for explaining the operations are omitted.

FIG. 6 illustrates driving oscillation. The driving oscillation corresponds to bending oscillation of the drive arms 23 as indicated by arrows "A". In the oscillation, the oscillation form indicated by the solid line and the oscillation form indicated by the broken line are repeated at predetermined frequency. In this case, the pair of drive arms 23 on the lateral sides of the two sensor arms 24 are line-symmetrically oscillated with the two sensor arms 24 as the center line. Accordingly, almost no oscillation is caused in the transmission arm 22 and the sensor arms 24.

If a rotating angular velocity "ω" having a rotation axis perpendicular to the plane containing the angular velocity sensing element 2, is applied to the drive arms 23 which are in the driving oscillation state as shown in FIG. 6, the Coriolis force as indicated by arrows "B" will work on the drive arms 23. The Coriolis force will work oppositely on the pair of drive arms 23 on the lateral sides of the sensor arms 24 serving as the reference line.

As a result, as shown in FIG. 7, S-shaped bending oscillation is induced in the transmission arm 22. In the bending oscillation of the transmission arm 22, the center portion and the end portions of the transmission arm 22 serve as nodes and the portions to which the drive arms 23 are coupled serve as antinodes.

When the bending oscillation of the transmission arm 22 is transmitted to the sensor arms 24, sensing oscillation is induced in the sensor arms 24. The sensing oscillation of the sensor arms 24 corresponds to the bending oscillation indicated by arrows "C". In the sensing oscillation, the oscillation forms indicated by the solid and the broken lines are repeated at predetermined frequency. At this time, the angular velocity is detected by taking out detection signals responsive to the oscillation of the sensor arms 24, from the piezoelectric elements 30a and 30b.

Figure 9:
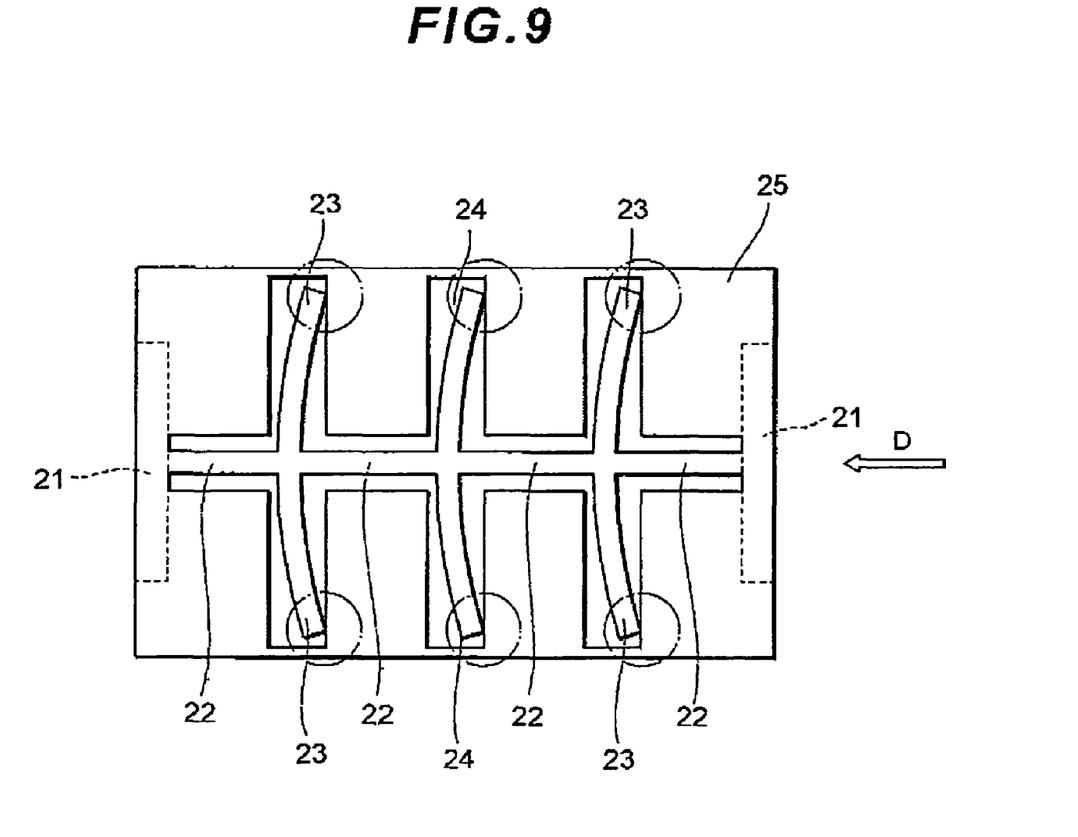
FIG. 9 illustrates the oscillation of the drive arms 23 and the sensor arms 24 induced by a shock D.

As shown in FIG. 9, in the case where an unexpectedly violent shock "D" is applied in the direction perpendicular to the direction in which the drive and sensor arms 23 and 24 are extended, the drive and sensor arms 23 and 24 are oscillated irrespective of the control effected by the piezoelectric element 30a. In this case, however, the drive and sensor arms 23 and 24 can be prevented from being excessively oscillated on a grand scale to an extent of being broken, because the oscillation range of the drive and sensor arms 23 and 24 is limited by the first stopper member 25.

Figure 10:
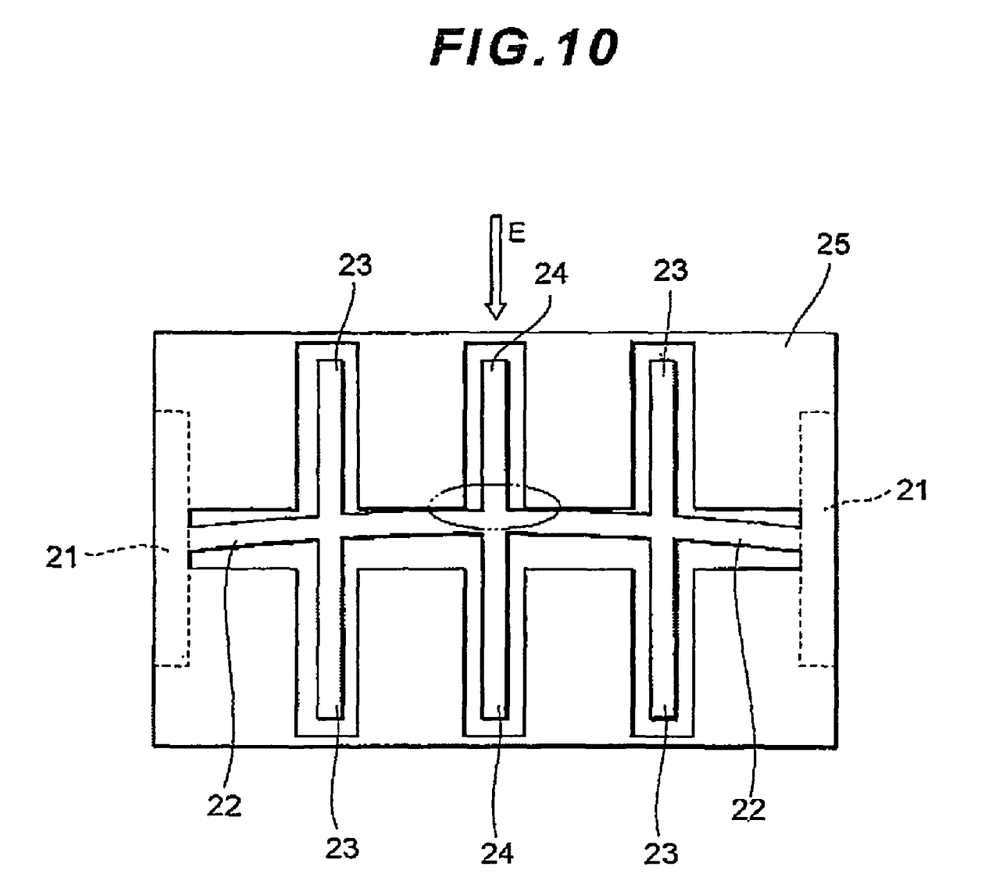
FIG. 10 illustrates the oscillation of the transmission arm 22 induced by a shock E.

Similarly, as shown in FIG. 10, for example, in the case where an unexpected shock "E" is applied in the direction perpendicular to the direction in which the transmission arm 22 is extended, the transmission arm 22 is oscillated irrespective of the Coriolis force. In this case, however, the transmission arm 22 can be prevented from being excessively oscillated on a grand scale to an extent of being broken, because the oscillation range of the transmission arm 22 is limited by the first stopper member 25.

As described above, the angular velocity sensing element 2 according to the present embodiment is provided with the stopper member which is arranged to limit the oscillation range of the oscillation arms (the transmission arm 22, the drive arms 23 and the sensor arms 24). The oscillation arms are likely to be oscillated on a grand scale when an excessively large shock is applied to the angular velocity sensing element 2. For example, the free end sides (open end sides) of the oscillation arms are likely to be oscillated at excessively large amplitude with respect to the fixing ends, or a plurality of portions of the oscillation arms, which reside between the fixing ends, are likely to be oscillated at excessively large amplitude with respect to the fixing ends with the configuration of the present embodiment, however, the oscillated portions of the oscillation arms come in touch, for example, with the stopper member, so that the oscillation will be limited within the space defined by the stopper member. Thus, even when an excessively large shock is applied to the element, the oscillation of the oscillation arms is permitted to fall within an allowable range to thereby prevent damage and breakage of the element.

In particular, as in the present embodiment, it is preferred to use the first stopper member 25 as a stopper member, which is arranged in a plane where the oscillation arms are formed, to thereby limit the oscillation range of the oscillation arms residing in the plane. In the case where the oscillation arms are formed of a semiconductor material, portions of the semiconductor material corresponding to the portions other than the oscillation arms may be removed by physical or chemical etching, for example, to facilitate the formation of the oscillation arms extended in the plane. With this structure, there is a concern that the oscillation arms may produce in-plane oscillation (the oscillation along the plane). In this regard, the arrangement of the first stopper member 25 in the plane where the oscillation arms are formed may effectively permit the first stopper member 25 to limit the in-plane oscillation of the oscillation arms. Also, the first stopper member 25 can be fabricated concurrently with the formation of the oscillation arms, by processing a semiconductor material. Therefore, the fabrication processes of the angular velocity sensing element can be simplified for the enhancement of the productivity. In addition, the arrangement of the oscillation arms and the first stopper member 25 in the same plane can contribute to reducing the height of the angular velocity sensing element. Moreover, since the range of the sensing oscillation of the sensor arms 24 can be limited by the first stopper member 25, signals of excessively large intensity can be prevented from being inputted to the detection circuit in the integrated circuit element 3, thereby eliminating the necessity of processing, for example, of these signals.

Second Embodiment

Figure 11A:
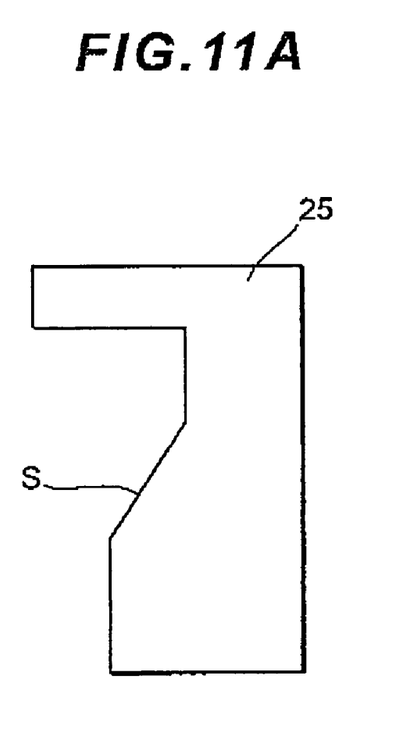
FIGS. 11A and 11B are plan views illustrating a principal part of a first stopper member 25 in an angular velocity sensing element according to a second embodiment of the present invention.
Figure 11B:
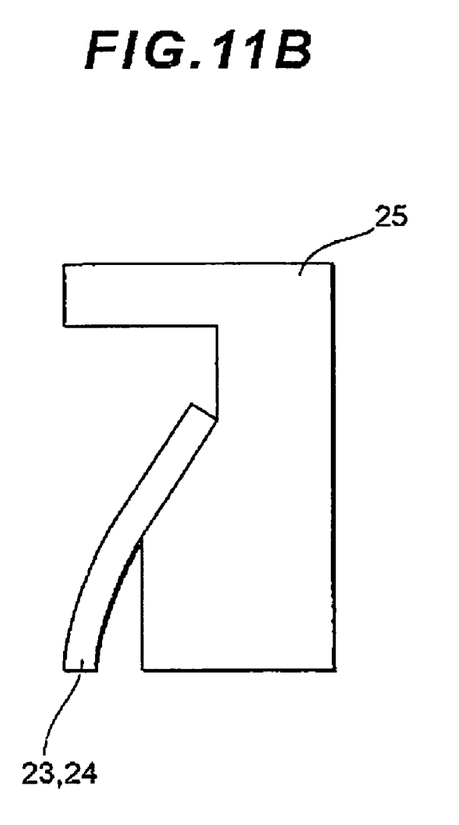

The angular velocity sensing element 2 according to a second embodiment is the same with that of the first embodiment except the shape of the first stopper member 25 in a touch portion thereof, which comes in touch with each of the oscillation arms. FIG. 11A is a plan view illustrating a principal part of the first stopper member 25. FIG. 11B is a plan view illustrating a state where the drive arm 23 or the sensor arm 24 is in touch with the first stopper member 25.

As shown in FIG. 11A, in the present embodiment, the first stopper member 25 in a touch portion "S" is processed into a form for matching the form of the drive arm 23 or the sensor arm 24 in touch with the first stopper member 25. The form of the first stopper member 25 may be processed so as to match the form of the transmission arm 22.

According to the present embodiment, the portion of each oscillation arm, which comes in touch with the first stopper member 25 is supported by a face of the first stopper member. Thus, the impulsive force at the time when each oscillation arm collides against the first stopper member 25 will not be locally focused (e.g., on a point) but the impulsive force will be dispersed in the touch surface between the first stopper member 25 and the oscillation arm. Thus, the oscillation arms can be prevented from being damaged or broken by such impulse.

Third Embodiment

In the angular velocity sensing element 2 described in a third embodiment, the oscillation range of the oscillation arms is also limited in the direction perpendicular to the plane in which the oscillation arms are formed.

Figure 12:
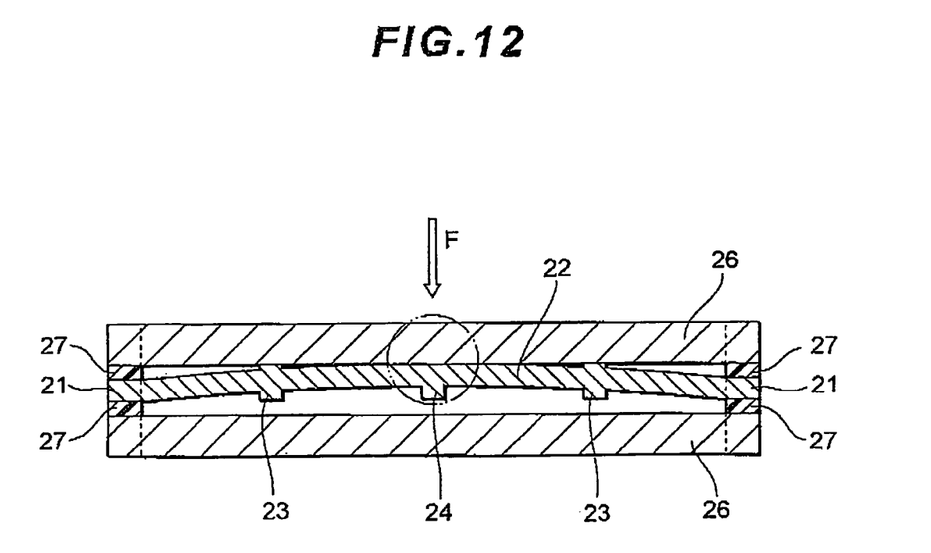
FIG. 12 is a cross-sectional view illustrating an angular velocity sensing element according to a third embodiment of the present invention.

FIG. 12 is a cross-sectional view illustrating the angular velocity sensing element 2 according to the third embodiment.

As shown in FIG. 12, two second stopper members 26 and 26 are arranged in the direction perpendicular to the plane where the oscillation arms consisting of the transmission arm 22, the drive arms 23 and the sensor arms 24 are formed. The second stopper members 26 and 26 each has a shape of a plate and are fixed to the fixing portion 21 and an outer edge of the first stopper member 25 via an adhesion layer 27, for example. Unlike the first stopper member 25, each second stopper member 26 is not required to be formed of the same material as the oscillation arms. Thus, glass, for example, may be used as the material.

In this way, in the present embodiment, the second stopper members 26 and 26 are provided. The second stopper members are arranged in those planes which are different from the plane where the oscillation arms are formed to thereby limit the oscillation range of the oscillation arms in the direction intersecting the plane where the oscillation arms are formed. As described in the first embodiment, in-plane oscillation may chiefly be produced in the plane where the oscillation arms are extended, depending on the forms of the oscillation arms. However, depending on the directions of the external shock, it may be well expected that oscillation in a direction different from the direction of the plane, that is, in a direction other than the direction of the plane (out-of-plane oscillation), may be caused. For example, if each oscillation arm has a plate-like shape with a certain width, possible oscillations that may be expected in terms of the geometrical structure include oscillation perpendicular to the plane extended from the arm, twisted oscillation, and oscillation in the unobstructed direction, depending on the shapes of the oscillation arm. In such a case, if each second stopper member 26 is arranged in the direction intersecting the plane extended from the oscillation arms, the oscillation of the oscillation arms in the direction other than the direction of the plane may also be effectively limited by the second stopper members. As a result, even when an excessively large shock is applied not only in the direction of the plane of the angular velocity sensing element 2, but also in the direction perpendicular to the plane, the oscillation arms can be prevented from being damaged and broken.

Fourth Embodiment

In a fourth embodiment, a description is provided on a tuning-fork-type angular velocity sensing element.

Figure 13:
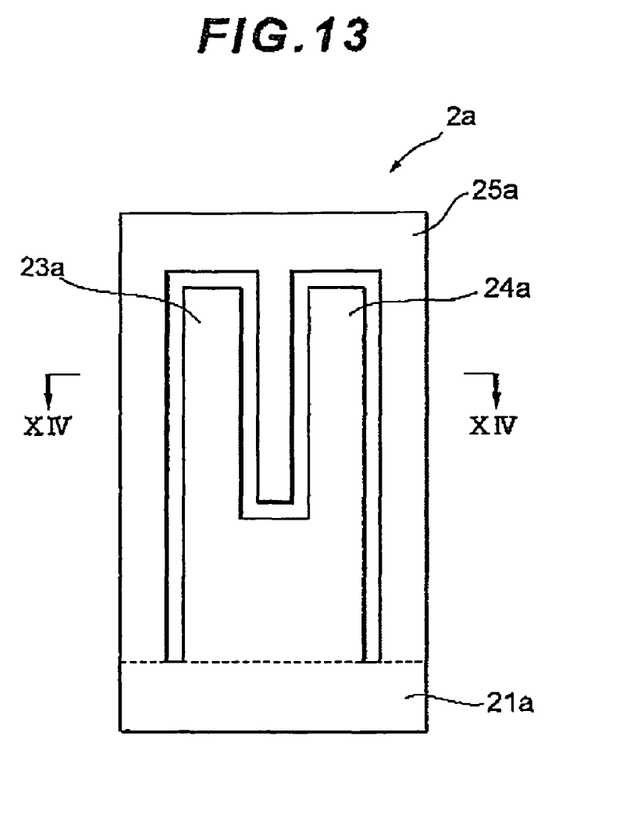
FIG. 13 illustrates the configuration of an angular velocity sensing element according to a fourth embodiment of the present invention.
Figure 14:
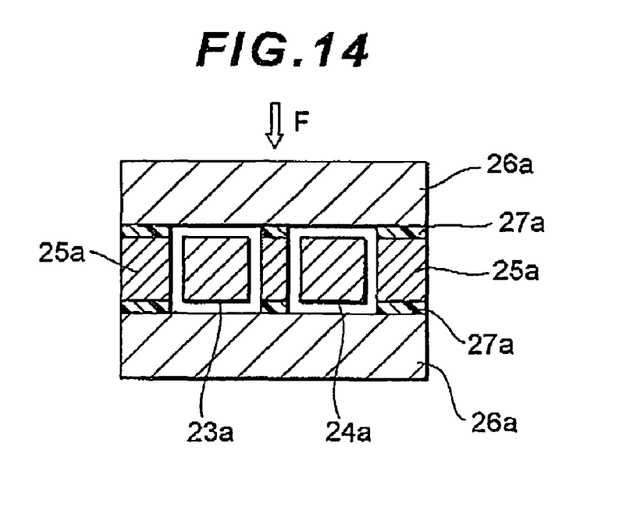
FIG. 14 is a cross-sectional view taken along XIV-XIV line of FIG. 13.

FIG. 13 illustrates a planar configuration of a tuning-fork-type angular velocity sensing element 2a. FIG. 14 is a cross-sectional view taken along XIV-XIV line of FIG. 13. In FIG. 13, second stopper members 26a on top and bottom are omitted in order to illustrate the shape of each oscillation arm.

As shown in FIG. 13, the tuning-fork-type angular velocity sensing element 2a includes a fixing portion 21a and two oscillation arms 23a and 24a. Similar to the first embodiment, the fixing portion 21a, the oscillation arms 23a and 24a, and a first stopper member 25a are made of the same semiconductor material, such as silicon. These components can be formed at a time by patterning wafer.

The first stopper member 25a is arranged with a given space being provided between itself and each of the oscillation arms 23a and 24a. Also, two second stopper members 26a are arranged in the direction perpendicular to the plane where the oscillation arms 23a and 24a are formed. The second stopper members 26a are fixed to the first stopper member 25a and the fixing portion 21a using an adhesion layer 27a. As to the spaces starting from the first and second stopper members 25a and 26a to each of the oscillation arms 23a and 24a, the same explanation given in the first embodiment applies.

According to the fourth embodiment, the amplitude of the oscillation arms 23a and 24a in the three-dimensional direction is limited by the first and second stopper members 25a and 26a. Therefore, for the same reasons given in the first embodiment, the tuning-fork-type angular velocity sensing element 2a which is unlikely to be damaged or broken by any three-dimensional shocks can be realized. Similar to the first embodiment, a configuration without the second stopper members 26a may be available. In this case, the tuning-fork-type angular velocity sensing element 2a which is unlikely to be damaged or broken by two-dimensional shocks can be realized.

Fifth Embodiment

In a fifth embodiment, a description is provided on an H-shaped angular velocity sensing element.

Figure 15:
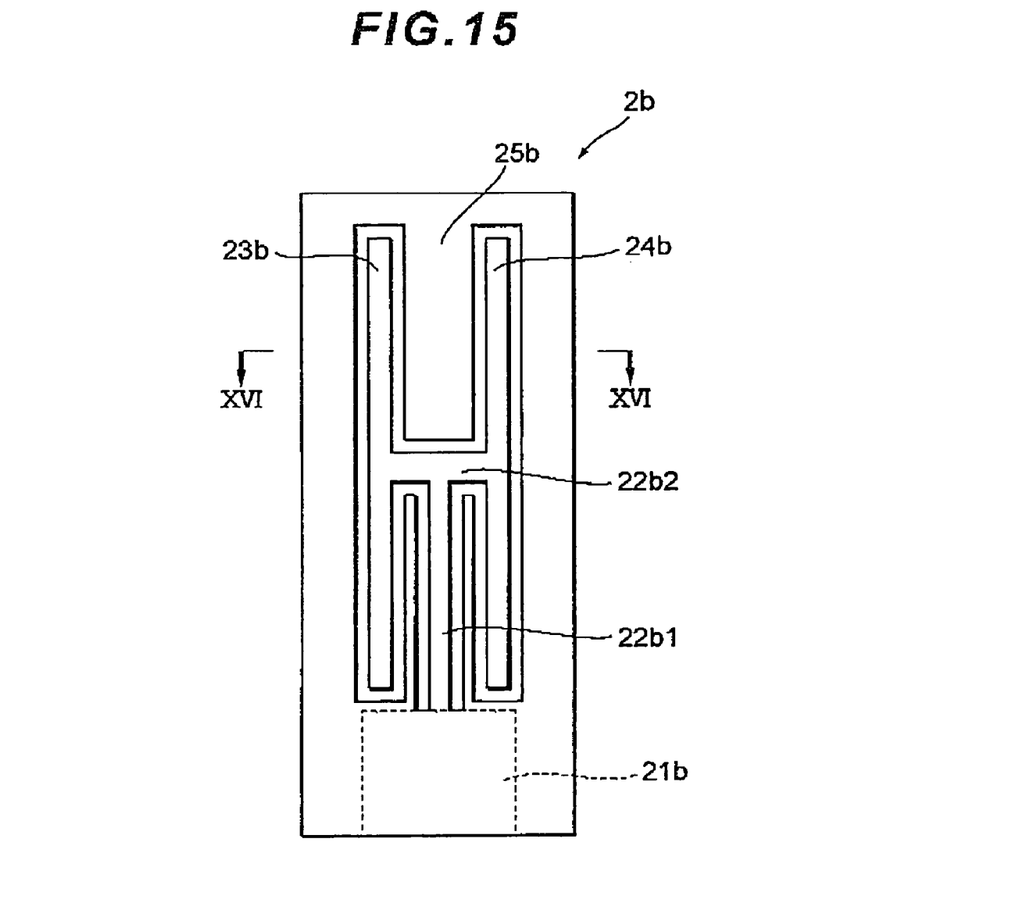
FIG. 15 illustrates the configuration of an angular velocity sensing element according to a fifth embodiment of the present invention.
Figure 16:
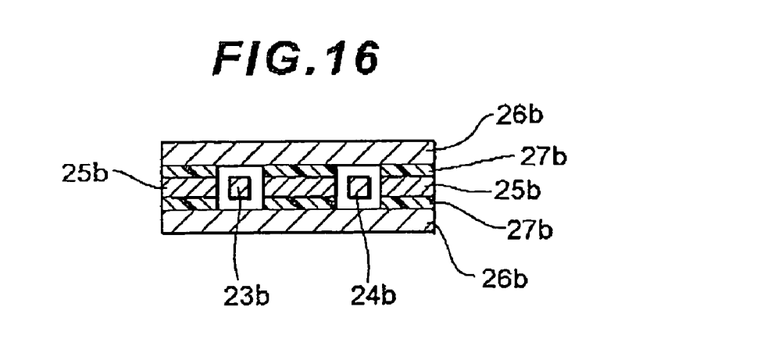
FIG. 16 is a cross-sectional view taken along XVI-XVI line of FIG. 15.

FIG. 15 illustrates a planar configuration of an H-shaped angular velocity sensing element 2b. FIG. 16 is a cross-sectional view taken along XVI-XVI line of FIG. 15. In FIG. 15, second stopper members 26b on top and bottom are omitted in order to illustrate the shape of each oscillation arm.

As shown in FIG. 15, the H-shaped angular velocity sensing element 2b includes a fixing portion 21b, an oscillation arm 22b1 having one end coupled to the fixing portion 21b, an oscillation arm 22b2 having a center corresponding to the other end of the oscillation arm 22b1 and extended in the direction perpendicular to the direction in which the oscillation arm 22b1 is extended, an oscillation arm 23b having a center corresponding to one end of the oscillation arm 22b2 and extended in the direction perpendicular to the direction in which the oscillation arm 22b2 is extended, and an oscillation arm 24b having a center corresponding to the other end of the oscillation arm 22b2 and extended in the direction perpendicular to the direction in which the oscillation arm 22b2 is extended.

Similar to the first embodiment, in the angular velocity sensing element 2b, the fixing portion 21b, the oscillation arms 22b1, 22b2, 23b and 24b as well as a first stopper member 25b are made of the same semiconductor material, such as silicon. These components can be formed at a time by patterning wafer.

The first stopper member 25b is arranged with a given space being provided between it self and the oscillation arms 22b1, 22b2, 23b and 24b. Also, two second stopper members 26b are arranged in the direction perpendicular to the plane where the oscillation arms are formed. The second stopper members 26b are fixed to the first stopper member 25b and the fixing portion 21b using an adhesion layer 27b. As to the space starting from the first and second stopper members 25b and 26b to each of the oscillation arms, the same explanation given in the first embodiment applies.

According to the fifth embodiment, the amplitude of the oscillation arms 22b1, 22b2, 23b and 24b in the three-dimensional direction is limited by the first and second stopper members 25b and 26b. Therefore, for the same reasons given in the first embodiment, the H-shaped angular velocity sensing element 2b which is unlikely to be broken by any three-dimensional shocks can be realized. Similar to the first embodiment, a configuration without the second stopper members 26b may be available. In this case, the H-shaped angular velocity sensing element 2b which is unlikely to be broken by two-dimensional shocks can be realized.

As described above, the present invention should not be limited to the embodiments described above, but may be variously modified within a range of not changing the outline of the invention. There is no limitation in the shapes of the individual stopper members. For example, each of the stopper members may be formed independent of the fixing portions and the oscillation arms.

Figure 17:
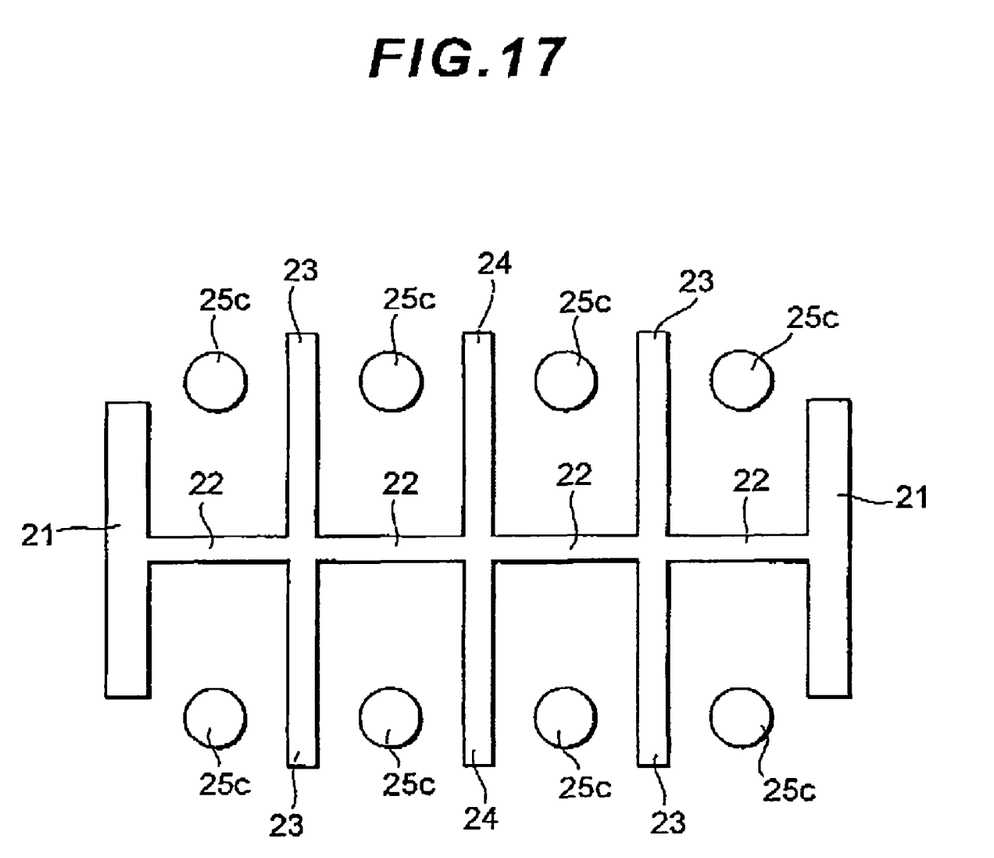
FIG. 17 is a plan view illustrating a modification of the first stopper member.

FIG. 17 is a top view illustrating an angular velocity sensing element provided with island-shaped first stopper members 25c which are formed separately from the fixing portions 21 and the oscillation arms 22 to 24. FIG. 17 shows an example in which the first stopper members 25c each having a columnar shape are arranged on lateral sides of the drive arms 23 and the sensor arms 24. In the example shown in FIG. 17, the first stopper members 25c are configured to collide against the drive arms 23 and the sensor arms 24 at the time of excessive oscillation. Alternative to this, being optimized in the shape and arrangement, the island-shaped first stopper members 25c may be configured to also collide against the transmission arm 22 in addition to the drive arms 23 and the sensor arms 24.

As shown in FIG. 17, the first stopper members 25c may be formed independent of the oscillation arms and the fixing portions, so that the shock at the time when the oscillation arms collide against the first stopper members 25c cannot be easily transmitted throughout the element.

Further, for example, as stopper members, only the second stopper members 26 may be provided without providing the first stopper member 25. In addition, for example, there is no limitation in the arrangement and the shapes of the oscillation arms. Also, there is no limitation in the detection principle of the angular velocity. Further, there is no limitation in the arrangement and the configuration of the piezoelectric elements, for the oscillation arms.

The angular velocity sensing element of the present invention can be loaded on any system and apparatus which requires detection of angular velocity. For example, the angular velocity sensing element of the present invention can be utilized in video camera shake detection, motion sensing in a virtual reality system, and direction finding in a car navigation system.

What is claimed is:

1. An angular velocity sensing element comprising:
   oscillation arms formed of a semiconductor material;
   piezoelectric elements formed on the oscillation arms; and
   a stopper member provided to limit an oscillation range of the respective oscillation arms, wherein the stopper member comprises:
   a first stopper member that is arranged along a plane where the oscillation arms are formed, and that is arranged to enclose the entire outline of the respective oscillation arms to limit the planar oscillation range of the respective oscillation arms.

2. The angular velocity sensing element according to claim 1, the stopper member further comprising:
   a second stopper member that is arranged along a plane which is different from the plane where the oscillation arms are formed, and that limits the oscillation range of the respective oscillation arms, the range being in a direction intersecting the plane where the oscillation arms are formed.

3. The angular velocity sensing element according to claim 1, wherein:
   the stopper member comprises a part with which the respective oscillation arms come in touch, the part having a shape that goes along a form of the respective oscillation arms when the part comes in touch with the respective oscillation arms.

4. The angular velocity sensing element according to claim 1, wherein:
   the oscillation arms comprise a drive arm, a sensor arm, and a transmission arm.

* * * * *